R. Beem,
Jaw Trap.
N° 76,700  Patented Apr. 14, 1868.
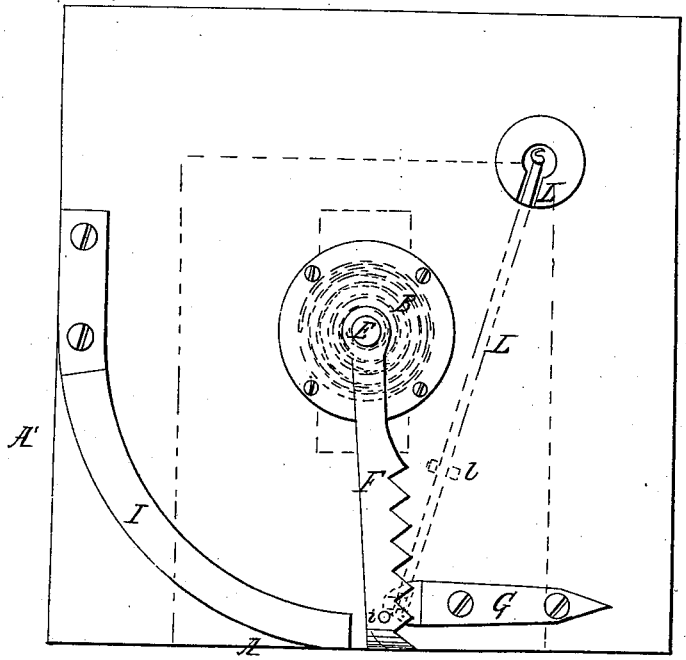
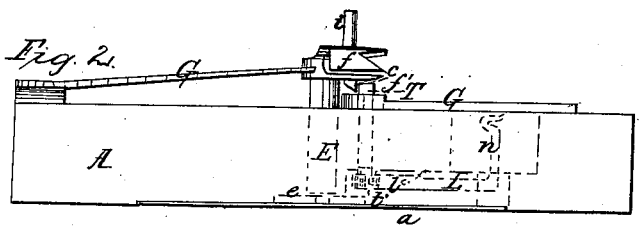
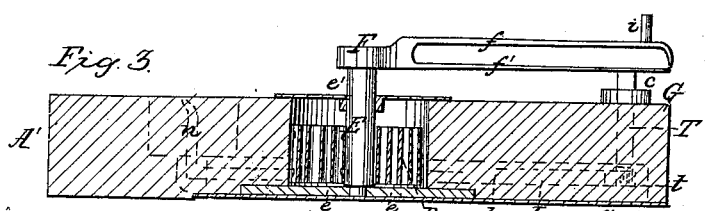
Witnesses:
V. Clayton
J. G. Clayton
Inventor.
Richard Beem
by Atty
Jo. C. Clayton & Co.

United States Patent Office.

RICHARD BEEM, OF ANTRIM, OHIO.

Letters Patent No. 76,700, dated April 14, 1868.

---

IMPROVED RAT-TRAP.

---

The Schedule referred to in these Letters Patent and making part of the same.

---

TO ALL WHOM IT MAY CONCERN:

Be it known that I, RICHARD BEEM, of Antrim, in the county of Guernsey, and in the State of Ohio, have invented certain new and useful Improvements in Traps for Rats and other animals; and I do hereby declare that the following is a full, clear, and exact description thereof, reference being had to the accompanying drawings, and to the letters of reference marked thereon.

The nature of my invention consists in a simple and effective combination of springs and trigger, to produce a rat or animal-trap which will be self-setting. In the drawings—

Figure 1 is a top view of the trap in the position it occupies when ready for action.

Figure 2 is an end elevation of the trap, viewed from the end, marked A in fig. 1, and shows in dotted lines the trigger as it is when the trap is "set."

Figure 3 is a cross-section through the trap and its main-spring, viewed from side A' in fig. 1. The dotted lines represent the trigger, which is on the farther side of the main-spring from the beholder.

To enable those skilled in the art to make and use my invention, I will now describe its construction and operation.

The body of the trap, A A', fig. 1, is made of a board, about an inch and a half thick, and six or more inches square. A circular hole is made in its centre, extending clear through the board, and of sufficient size to admit a spring, similar to the main-spring of a common clock when it is unwound. The spring B is fastened to shaft E by its inner end, and to the body A A' by its outer end, when the spring and shaft are put into their place in the circular hole. The lower end of shaft E has its bearing on block or plate $e$, and its upper bearing in plate $e'$. Plates $e$ and $e'$ are firmly secured to body A A'. There is an arm, F, secured to the upper end of shaft E as it projects above the surface of the trap a short distance. Arm F is divided, as shown in fig. 3, into two other arms, $f f'$, each having one of its edges serrated, as may be seen in fig. 1. Arm $f$ has a small knob, $i$, on its outer end, with which to turn or wind the main-spring up. Arm $f'$ has a little catch, $c$, on its under side, near its outer end, which catches against the trigger, T, as it reaches up through its guide, G, which is secured on the top of the trap. The lower end of trigger T is pivoted at $t$ to lever L, which is pivoted at $l$, and the other end of lever L terminates in an upright arm, $n$, to which the bait is secured. This end of the lever is heavier than the one to which the trigger is attached, and thus bears up the trigger T into its proper position. A suitable-sized hole is cut in the body A A' from the top side almost through, up through which arm $n$ projects. A slot or hole is also made in the under side of body A, leading from the bait-arm $n$ to trigger T, in which lever L works. A sliding bottom, $a$, (see figs. 2 and 3) made of wood or sheet metal, is provided, to cover up the internal arrangements, and keep them in better security.

I provide a spring, I, which is equal in length to one-fourth of the space gone over by the outer end of arm F, and fix one end of it on the top side of the body at A'; the other end terminates a short distance before it reaches trigger T, and somewhat higher than it, by reason of its having slight elevation given it by bending it at or near the point where it is secured, thus forming on its upper surface an inclined plane. This spring I should be very stiff, so that arm F will be retarded a good deal in passing over it, so that when the arm F leaves spring I, its accelerated velocity will not aid the strength of main-spring B when catch $c$ of arm $f'$ strikes the trigger T, as otherwise the trigger might probably be broken or knocked out of position.

To operate my invention, I take hold of knob $i$ and turn the arm F in the direction of its side opposed to its serrated edge, passing in its course trigger T first, and then over spring I, and so on till spring B is wound as tight as possible. The catch $c$ of arm F is then allowed to catch against trigger T, and the bait having been put on arm $n$ of lever L, the trap is "set." The rat or other animal on biting the bait, pulls arm $n$, and with it the end of lever L, between pivot $l$ and arm $n$, upwards, and of course depressing the opposite end of lever L, and with it trigger T, and that releases catch $c$, freeing arm F, which is revolved with shaft E by main-spring B. The arm F swings swiftly around, with its serrated edge towards and over the bait on arm $n$, destroys the creature at the bait, and, at the same time, knocks the creature off the trap, then strikes spring I, and the friction caused by sliding over spring I deprives it of some of its power, and, on sliding off spring I, is readily held by its catch, $c$, at trigger T, and thus the trap is reset.

The advantage of my invention over the other improvements in this class of inventions is sufficiently obvious when its extreme simplicity of construction is seen to be only equalled by its ingenuity for effecting the desired object of destroying many creatures, by preparing the trap but once, as well as from its perfect security from the disarrangement of its working abilities.

Having thus fully described my invention, what I claim as new, and desire to secure by Letters Patent, is—

1. Arm F, with its serrated arms $f$ and $f'$, catch $c$, and knob $i$, in combination with main-spring B and shaft E, when constructed and operating substantially in the manner and for the purposes set forth.

2. Spring I, when constructed and operating substantially in the manner and for the purposes set forth.

3. Trigger T, with its guide G, when constructed and operating with lever L and bait-arm $n$, substantially in the manner and for the purposes set forth.

4. Arm F, shaft E, spring B, when constructed and operating in combination with spring I, trigger T, guide G, lever L, bait-arm $n$, body A A', and bottom $a$, substantially in the manner and for the purposes set forth.

In testimony that I claim the above-described invention, I have hereunto signed my name, this 26th day of November, 1867.

RICHARD BEEM.

Witnesses:
    J. BOYTON,
    JESSE COOK.